(No Model.)
L. HOLT.
PNEUMATIC TIRE.
No. 509,164.  Patented Nov. 21, 1893.
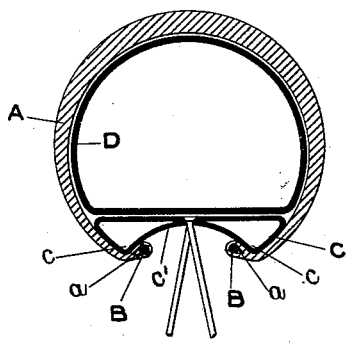
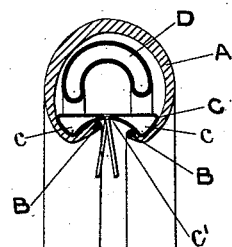
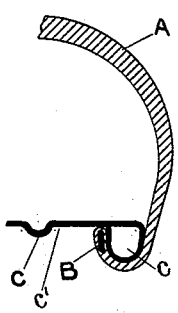
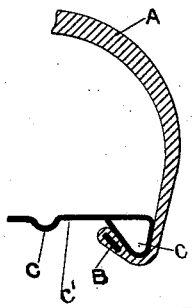
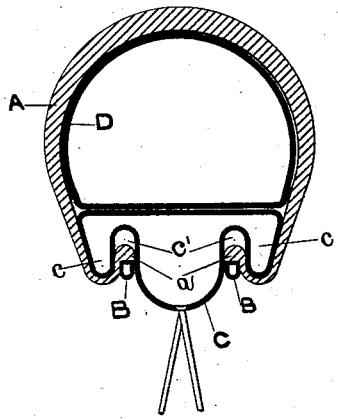
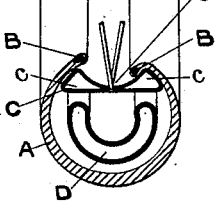
WITNESSES:
INVENTOR:

UNITED STATES PATENT OFFICE.

LEOPOLD HOLT, OF FRANKFORT-ON-THE-MAIN, GERMANY.

PNEUMATIC TIRE.

SPECIFICATION forming part of Letters Patent No. 509,164, dated November 21, 1893.

Application filed May 20, 1893. Serial No. 474,914. (No model.) Patented in England October 21, 1892, No. 18,885.

*To all whom it may concern:*

Be it known that I, LEOPOLD HOLT, a subject of the Queen of Great Britain, temporarily residing at Frankfort-on-the-Main, Germany, have invented a new and useful Improvement in Pneumatic-Tired Wheels, (for which I have obtained a patent in Great Britain, No. 18,885, bearing date October 21, 1892,) of which the following is a specification.

My invention relates to an improved method of securing the cover of a pneumatic tire to a wheel rim, the object being to facilitate the removal of the cover of the tire from the rim of the wheel and its replacement again when the necessity arises for repairing the tire.

To this end my invention consists in forming in the inner face of the rim, *i. e.*, the face adapted to receive the spokes of the wheel, a groove or recess, and in placing in the edges of the cover metallic hoops or rings adapted to be placed in the groove or recess in the inner face of the rim and to engage with the sides or flanges thereof and thus secure the cover to the wheel rim.

In the accompanying drawings which form part of this specification, Figures 1, 2, and 3 are views in transverse section of a tire and wheel rim showing several ways in which my invention may be carried into practice. Figs. 4 and 5 are broken views in transverse section showing other forms my invention may assume, and Fig. 6 is a diagrammatic view showing how the cover of the tire is removed from the wheel rim.

The cover A of the tire which is made of rubber reinforced with canvas in the well-known manner has formed in its edges pockets *a, a,* in each of which is placed an endless hoop or ring B of metal or other suitable material. These endless hoops or rings are made sufficiently strong to prevent inward buckling and they may be made either of round wire as shown by Figs. 1 and 2 of strips of metal of a flat section as shown by Figs. 4 and 5, or of a tubular section as shown by Fig. 3. The wheel rim C is made flat on its outer face and has formed on its inner side, *i. e.*, the side adapted to receive the spokes, inwardly projecting flanges or beads *c, c,* forming a central recess or groove *c'* in its inner face. The hoops or rings B are of a larger diameter than the internal diameter of the wheel rim measured from edge to edge of the inwardly projecting flanges or beads *c, c,* so that when the edges of the cover containing the hoops or rings are once placed in the groove *c'* in the rim they cannot become disengaged from the rim unless they are manipulated for that purpose. Each edge of the cover is got into position by placing one part of the hoop or ring in the edge into the central groove *c'* in the inner face of the rim C until the hoop or ring becomes eccentric with the flanges or beads *c, c,* on the rim which allows the part diametrically opposite to pass over the flange or bead into the groove *c'* as shown by the left hand side of Fig. 6. To allow the hoops or rings B to be placed eccentric with the flanges *c, c,* forming the sides of the groove *c'* the diameter of the said groove measured at the bottom thereof is greater than that of the hoops or rings. When the edges of the cover are once got into position they seat themselves as shown by the right hand side of Fig. 6, automatically on the inflation of the air tube D, which is of the usual construction and is fitted with any suitable form of valve for inflation and deflation.

As a modification the hoops or rings B may be made independent of the edges of the cover A in which case beads or enlargements *a, a,* are formed on the edges of the cover for the hoops or rings B to engage with, and two independent grooves *c', c',* are formed in the inner face of the rim C as shown by Fig. 3 of the accompanying drawings.

It will be seen that as the edges of the cover are folded or lapped round the flanges or beads forming the sides of the groove in the inner face of the rim, there is considerable frictional contact between the cover and the rim, so that the entire strain due to the inflation of the tire is not placed upon the hoops or rings in the edges of the cover.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that the covers of pneumatic tires have already been secured to wheel rims by having wires or bands in their edges adapted to engage with a groove in the outer face of the rim, and I therefore do not broadly claim such as my invention, but, Having now particularly described and ascertained the nature of my said invention and in what manner the same is to be performed, I declare that what I desire to secure by Letters Patent is—

1. In a pneumatic tired wheel, the combination with a wheel rim having a flat outer face and having flanges or beads formed on its inner face adapted to form a central groove or depression in the rim; of a cover having a longitudinally rigid hoop or ring located in each edge, the diameters of the said hoops or rings being greater than the diameter of the central groove or depression in the inner face of the rim measured from edge to edge of the flanges or beads thereof; and of an air tube for inflating the tire, as set forth.

2. In a pneumatic tired wheel, the combination with a wheel rim having a flat outer face and having flanges or beads formed on its inner face adapted to form a central groove or depression in the rim; of a cover having a flat longitudinal rigid hoop or ring located in each edge the diameters of the said hoops or rings being greater than the diameter of the central groove or depression in the inner face of the rim measured from edge to edge of the flanges or beads thereof; and of an air tube for inflating the tire, as set forth.

LEOPOLD HOLT.

Witnesses:
ROBT. ED. PHILLIPS,
G. S. CLARK.